US005507067A

United States Patent [19]
Hoekstra et al.

[11] Patent Number: 5,507,067
[45] Date of Patent: Apr. 16, 1996

[54] ELECTRONIC VACUUM CLEANER CONTROL SYSTEM

[75] Inventors: Peter Hoekstra, Bristol, Tenn.; Timothy W. Jackson, Bristol, Va.; George C. Moyher, Jr., Bluff City, Tenn.; Odero Conci, Pascoe Vale, Australia

[73] Assignees: Newtronics Pty Ltd., Australia; Electrolux Corporation, Marietta, Ga.

[21] Appl. No.: 241,578

[22] Filed: May 12, 1994

[51] Int. Cl.⁶ .................................................. A47L 9/28
[52] U.S. Cl. ................................... 15/319; 15/339
[58] Field of Search .......................... 15/319, 339, 412

[56] References Cited

U.S. PATENT DOCUMENTS

| Re. 28,268 | 12/1974 | Autrand | 116/67 R |
|---|---|---|---|
| Re. 28,290 | 8/1976 | Schwartz | 15/339 |
| Re. 34,286 | 6/1993 | Toyoshima et al. | 15/319 |
| 3,172,743 | 3/1965 | Kowalewski | 55/214 |
| 3,210,793 | 10/1965 | Waters | 15/339 |
| 3,333,564 | 8/1967 | Waters | 116/114 |
| 3,381,652 | 5/1968 | Schaefer et al. | 116/114 |

(List continued on next page.)

FOREIGN PATENT DOCUMENTS

| 0224309A1 | 6/1987 | European Pat. Off. . |
|---|---|---|
| 0285801A1 | 10/1988 | European Pat. Off. . |
| 0546620A1 | 6/1993 | European Pat. Off. . |
| 2197555 | 3/1974 | France . |
| 2900433 | 6/1980 | Germany . |
| 3629346A1 | 3/1988 | Germany . |
| 54-11991 | 5/1979 | Japan . |
| 54-11990 | 5/1979 | Japan . |
| 60-41891 | 12/1985 | Japan . |
| 60-58850 | 12/1985 | Japan . |
| 60-58846 | 12/1985 | Japan . |
| 61-35864 | 8/1986 | Japan . |
| 61-42574 | 9/1986 | Japan . |
| 61-30603 | 9/1986 | Japan . |
| 62-23429 | 6/1987 | Japan . |
| 62-23428 | 6/1987 | Japan . |
| 62-26045 | 7/1987 | Japan . |
| 62-45637 | 12/1987 | Japan . |
| 63-14765 | 4/1988 | Japan . |
| 63-23773 | 5/1988 | Japan . |

(List continued on next page.)

OTHER PUBLICATIONS

"The Fuzzy Logic Vacuum Cleaner," S. Abe, Y. Hara, H. Terai, S. Yamaguchi, and S. Kondoh of Matsushita, believed to have been presented in connection with the Apr. 1993 Appliance Conference in Milwaukee, Wis.

National Vacuum Canister MC–S80VPK 100 V 1000V Operation Manual (May 6, 1992).

*Primary Examiner*—Chris K. Moore
*Attorney, Agent, or Firm*—Fish & Neave; Jeffrey H. Ingerman; G. Victor Treyz

[57] ABSTRACT

An electronic control system for a vacuum cleaner is provided that supports two-way communications between a microcontroller in the handle of the vacuum cleaner and a suction motor and various sensors in the canister of the vacuum cleaner. The vacuum cleaner may be placed in one of two user-selectable bag change modes. In a maximum suction bag change mode, the electronic control system of vacuum cleaner will shut off the vacuum cleaner when the vacuum cleaner bag has filled and the suction power of the unit has been degraded as a result. If the maximum fill bag change mode is selected, the electronic control system will shut off the vacuum cleaner only after the bag has filled to the maximum extent allowable. The control system has indicator lights to display to the user whether the maximum suction or the maximum fill mode has been selected. The control system also has an optical dust sensor based on one-piece lens units located in the vacuum cleaner handle for monitoring the frequency with which dust particles flow into the vacuum cleaner. The control system can automatically adjust the power setting of the vacuum cleaner based on the measured frequency.

15 Claims, 12 Drawing Sheets

U.S. PATENT DOCUMENTS

| | | | |
|---|---|---|---|
| 3,382,524 | 5/1968 | Sandstrom | 15/314 |
| 3,577,869 | 5/1971 | Hosokawa et al. | 55/361 |
| 3,579,706 | 5/1971 | Hetland | 15/327 |
| 3,588,943 | 6/1971 | Hetland | 15/327 |
| 3,745,965 | 7/1973 | Ljung et al. | 116/112 |
| 3,936,904 | 2/1976 | Bashark | 15/339 |
| 4,001,912 | 1/1977 | Eriksson | 15/339 |
| 4,020,525 | 5/1977 | Fromknecht et al. | 15/339 |
| 4,021,879 | 5/1977 | Brigham | 15/339 |
| 4,060,050 | 11/1977 | Simonsson | 116/114 |
| 4,070,170 | 1/1978 | Leinfelt | 55/274 |
| 4,100,878 | 7/1978 | Leinfelt | 116/114 |
| 4,124,916 | 11/1978 | Fromknecht | 15/339 |
| 4,184,225 | 1/1980 | Leinfelt | 15/339 |
| 4,193,292 | 3/1980 | Simonsson | 73/38 |
| 4,199,838 | 4/1980 | Simonsson | 15/339 |
| 4,233,597 | 11/1980 | Kurz | 340/626 |
| 4,330,900 | 5/1982 | Dörr et al. | 15/339 |
| 4,357,729 | 11/1982 | Vander Molen et al. | 15/319 |
| 4,370,690 | 1/1983 | Baker | 361/23 |
| 4,370,776 | 2/1983 | Kullik | 15/319 |
| 4,370,777 | 2/1983 | Woerwag | 15/339 |
| 4,399,585 | 8/1983 | Kullik et al. | 15/319 |
| 4,416,033 | 11/1983 | Specht | 15/339 |
| 4,419,782 | 12/1983 | Sobczyk et al. | 15/339 |
| 4,419,783 | 12/1983 | Steffen | 15/339 |
| 4,473,923 | 10/1984 | Neroni et al. | 15/377 |
| 4,481,692 | 11/1984 | Kurz | 15/339 |
| 4,514,874 | 5/1985 | Kurz | 15/319 |
| 4,580,311 | 4/1986 | Kurz | 15/319 |
| 4,601,082 | 7/1986 | Kurz | 15/319 |
| 4,611,365 | 9/1986 | Komatsu et al. | 15/339 |
| 4,654,924 | 4/1987 | Getz et al. | 15/319 |
| 4,680,827 | 7/1987 | Hummel | 15/319 |
| 4,733,430 | 3/1988 | Westergren | 15/339 |
| 4,733,431 | 3/1988 | Martin | 15/339 |
| 4,767,213 | 8/1988 | Hummel | 356/338 |
| 4,785,295 | 11/1988 | Fukui et al. | 340/679 |
| 4,817,234 | 4/1989 | Greulich | 15/339 |
| 4,880,474 | 11/1989 | Koharagi et al. | 134/21 |
| 4,920,605 | 5/1990 | Takashima | 15/319 |
| 4,937,912 | 7/1990 | Kurz | 15/339 |
| 4,940,474 | 7/1990 | Larsson et al. | 55/210 |
| 4,942,640 | 7/1990 | Hayashi et al. | 15/319 |
| 4,946,242 | 8/1990 | Tanno et al. | 350/96.15 |
| 4,953,253 | 9/1990 | Fukuda et al. | 15/319 |
| 4,958,406 | 9/1990 | Toyoshima et al. | 15/319 |
| 4,977,639 | 12/1990 | Takahashi et al. | 15/319 |
| 4,980,945 | 1/1991 | Bewley | 15/339 |
| 4,983,895 | 1/1991 | Koharagi et al. | 318/254 |
| 4,987,637 | 1/1991 | Zummer et al. | 15/328 |
| 4,993,104 | 2/1991 | Kasper et al. | 15/319 |
| 5,023,973 | 6/1991 | Tsuchida et al. | 15/319 |
| 5,033,151 | 7/1991 | Kraft et al. | 15/319 |
| 5,047,597 | 9/1991 | Jailor | 200/5 B |
| 5,075,607 | 12/1991 | Koharagi et al. | 318/254 |
| 5,081,738 | 1/1992 | Schiller et al. | 15/339 |
| 5,102,435 | 4/1992 | Rau et al. | 55/467 |
| 5,105,502 | 4/1992 | Takashima | 15/319 |
| 5,109,568 | 5/1992 | Rohn et al. | 15/410 |
| 5,136,750 | 8/1992 | Takashima et al. | 15/319 |
| 5,144,714 | 9/1992 | Mori et al. | 15/319 |
| 5,144,715 | 9/1992 | Matsuyo et al. | 15/319 |
| 5,152,028 | 10/1992 | Hirano | 15/319 |
| 5,155,885 | 10/1992 | Jyouraku et al. | 15/319 |
| 5,163,202 | 11/1992 | Kawakami et al. | 15/319 |
| 5,166,585 | 11/1992 | Koharagi et al. | 318/254 |
| 5,182,833 | 2/1993 | Yamaguchi et al. | 15/319 |
| 5,216,777 | 6/1993 | Moro et al. | 15/319 |
| 5,216,778 | 6/1993 | Suzuki et al. | 15/327.1 |
| 5,233,682 | 8/1993 | Abe et al. | 395/61 |
| 5,243,732 | 9/1993 | Koharagi et al. | 15/319 |
| 5,251,358 | 10/1993 | Moro et al. | 15/319 |
| 5,255,409 | 10/1993 | Fujiwara et al. | 15/319 |
| 5,265,305 | 11/1993 | Kraft et al. | 15/319 |
| 5,276,939 | 1/1994 | Uenishi | 15/319 |

FOREIGN PATENT DOCUMENTS

| | | | |
|---|---|---|---|
| 63-19014 | 5/1988 | Japan . | |
| 63-19016 | 5/1988 | Japan . | |
| 63-34614 | 9/1988 | Japan . | |
| 63-66209 | 12/1988 | Japan . | |
| 64-49 | 1/1989 | Japan . | |
| 64-2686 | 1/1989 | Japan . | |
| 64-6782 | 2/1989 | Japan . | |
| 64-10215 | 2/1989 | Japan . | |
| 1-37942 | 8/1989 | Japan . | |
| 1-38498 | 8/1989 | Japan . | |
| 1-26358 | 8/1989 | Japan . | |
| 2-115 | 1/1990 | Japan . | |
| 2-2273 | 1/1990 | Japan . | |
| 2-30683 | 7/1990 | Japan . | |
| 3-19335 | 4/1991 | Japan . | |
| 3-35249 | 7/1991 | Japan . | |
| 3-72287 | 11/1991 | Japan . | |
| 3-77729 | 12/1991 | Japan . | |
| 3-55432 | 12/1991 | Japan . | |
| 4-4886 | 1/1992 | Japan . | |
| 73033 | 3/1992 | Japan | 15/319 |
| 4-40008 | 7/1992 | Japan . | |
| 4-58330 | 9/1992 | Japan . | |
| 5-3237 | 1/1993 | Japan . | |
| 5-48688 | 7/1993 | Japan . | |
| 5-48689 | 7/1993 | Japan . | |
| 5-48687 | 7/1993 | Japan . | |
| 5-52739 | 8/1993 | Japan . | |
| 5-84163 | 12/1993 | Japan . | |
| 6-1101 | 1/1994 | Japan . | |
| 2046037 | 11/1980 | United Kingdom . | |

ELECTRONIC VACUUM CLEANER CONTROL SYSTEM

BACKGROUND OF THE INVENTION

This invention relates to vacuum cleaners, and more particularly to electronic control systems for vacuum cleaners.

Vacuum cleaners are typically provided with simple controls that allow the user to turn on and off the unit and perhaps to select the power to be applied to the suction motor to vary the level of suction. With the advent of lower costs for various electronic components, it has become feasible to provide additional features to the user using more sophisticated electronic control systems. In some instances, it has become possible to provide vacuum cleaners with microcontrollers to direct the operation of the unit. However, the functions that have been added have not always been those desired by the user. In other cases the added functionality provided by the addition of electronic controls has made vacuum cleaner control systems needlessly complex and overly expensive. For example, in canister vacuum cleaners two microcontrollers have sometimes been used to control the operation of the vacuum cleaner, one located in the canister and another in the handle that is connected to the vacuum cleaner hose and that contains the user controls. Other canister vacuum cleaners have supported various automatic modes of operation, but have either required that any optical dust sensor be located in the canister, which is cumbersome if the microcontroller used to control the operation of the vacuum cleaner is located in the handle, or have employed needlessly complex processing routines to determine the appropriate power setting of the suction motor. Still other vacuum cleaners have not allowed a user to easily select between a variety of bag change modes. While some previously known canister vacuum cleaners have had blow ports to which the vacuum cleaner hose could be attached, in has not been possible to control the operation of these vacuum cleaners using circuitry in a handle connected to the hose.

It would therefore be desirable to be able to provide a canister vacuum cleaner in which a microcontroller-based control unit contained in the handle of the vacuum cleaner is connected to the canister by a wired hose, which supports two-way communications between the control unit and the suction motor and various sensors contained in the canister, thereby allowing a single microcontroller to be used, simplifying the construction of the unit.

It would further be desirable to be able to provide a vacuum cleaner that can be placed in one of two user-selectable bag change modes: a maximum suction bag change mode, in which the vacuum cleaner shuts off when the pressure drop across the vacuum cleaner bag exceeds a predetermined threshold and a maximum fill bag change mode, in which the vacuum cleaner shuts off only after the pressure drop exceeds a higher threshold.

It also would be desirable to be able to provide a vacuum cleaner that has an optical dust sensor located in the handle of the vacuum cleaner, so that the vacuum cleaner can be placed in an automatic mode in which the power setting of the suction motor is adjusted based on the frequency with which dust particles are drawn past the sensor.

It also would be desirable to be able to provide a vacuum cleaner that has an optical dust sensor that is constructed from a light source and a photodetector, each of which is mounted in a lens unit having an integrally formed lens.

It also would be desirable to be able to provide a vacuum cleaner that has a blow port to which a vacuum cleaner hose can be attached and a control unit contained within a handle connected to the hose that contains circuitry for detecting when the hose is connected to the blow port.

SUMMARY OF THE INVENTION

In view of the foregoing, it is an object of this invention to provide an improved canister vacuum cleaner in which a microcontroller-based control unit contained in the handle of the vacuum cleaner is connected to the canister by a wired hose, which supports two-way communications between the control unit and the suction motor and various sensors contained in the canister, thereby allowing a single microcontroller to be used, simplifying the construction of the unit.

It is a further object of the invention to provide a vacuum cleaner that can be placed in one of two user-selectable bag change modes: a maximum suction bag change mode, in which the vacuum cleaner shuts off when the pressure drop across the vacuum cleaner bag exceeds a predetermined threshold and a maximum fill bag change mode, in which the vacuum cleaner shuts off only after the pressure drop exceeds a higher threshold.

It also is an object of the invention to provide a vacuum cleaner that has an optical dust sensor located in the handle of the vacuum cleaner, so that the vacuum cleaner can be placed in an automatic mode in which the power setting of the suction motor is adjusted based on the frequency with which dust particles are drawn past the sensor.

It is also an object of the invention to provide a vacuum cleaner that has an optical dust sensor that is constructed from a light source and a photodetector, each of which is mounted in a lens unit having an integrally formed lens.

It is also an object of the invention to provide a vacuum cleaner that has a blow port to which a vacuum cleaner hose can be attached and a control unit contained within a handle connected to the hose that contains circuitry for detecting when the hose is connected to the blow port.

In accordance with the present invention an improved electronic vacuum cleaner control system is provided for controlling the operation of a canister vacuum cleaner. The control system includes a control unit contained in the handle of the vacuum cleaner that is connected to a canister by a flexible hose. The hose contains a number of wires which support two-way communications between the control unit and the canister. The wires in the hose allow the canister to supply power to the control unit and also allow the control unit to receive signals from various sensors contained within the canister. The wires in the hose also allow the control unit to control the power that is applied to the vacuum cleaner suction motor by transmitting various control signals to the suction motor.

The vacuum cleaner of the present invention also allows the user to select between two user-selectable bag change modes—a maximum suction bag change mode and a maximum fill bag change mode. In the maximum suction bag change mode the vacuum cleaner shuts off when the pressure drop across the vacuum cleaner bag exceeds a predetermined threshold, which indicates that the bag has filled somewhat and the suction power of the vacuum cleaner has been degraded as a result. In the maximum fill bag change mode, the vacuum cleaner does not shut off until the pressure drop across the bag exceeds a higher threshold, indicating that the bag has filled to its maximum extent and that suction power has been substantially degraded.

Further, the vacuum cleaner has an optical dust sensor located in the handle of the vacuum cleaner, which allows the vacuum cleaner to operate in an automatic mode, in which the power setting of the suction motor is controlled by the vacuum cleaner based on the readings of the dust sensor. Specifically, the dust sensor and the vacuum cleaner control unit monitor the frequency with which dust particles are drawn past the sensor and adjust the power setting of the suction motor accordingly. The dust sensor is constructed from a light source and a photodetector, each of which is mounted in a lens unit having an integrally formed lens.

The vacuum cleaner also has a blow port to which a vacuum cleaner hose can be attached. The vacuum cleaner control unit contains circuitry for detecting when the hose is connected to the blow port. The control unit also contains switches that may be actuated by the user to select the power setting of the vacuum cleaner suction motor when the vacuum cleaner is operating in the blow port mode.

BRIEF DESCRIPTION OF THE DRAWINGS

The above and other advantages of the invention will be apparent upon consideration of the following detailed description, taken in conjunction with the accompanying drawings, in which like reference numerals refer to like parts throughout, and in which.

DETAILED DESCRIPTION OF THE INVENTION

Figure 1:
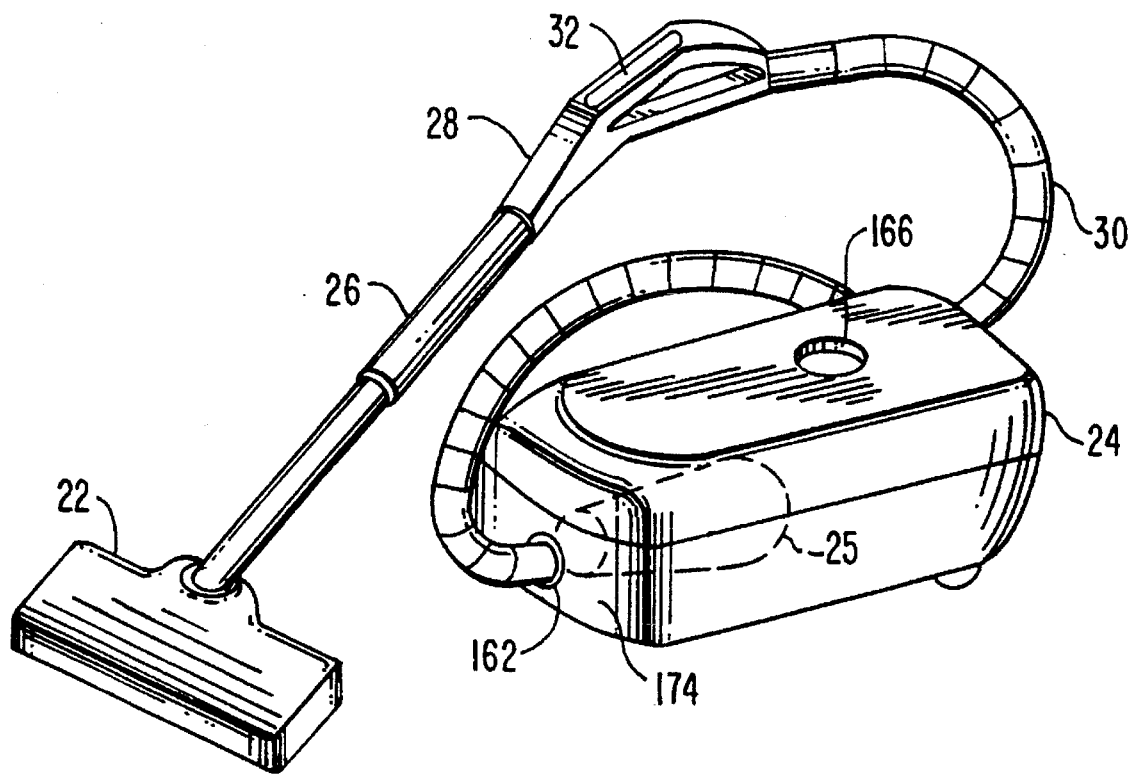
FIG. 1 is a perspective view of an illustrative embodiment of a canister vacuum cleaner using the electronic control system of the present invention.

In accordance with the present invention, vacuum cleaner 20, shown in FIG. 1, is provided with an electronic control system for controlling the operation of the vacuum cleaner 20. Vacuum cleaner 20 is preferably a canister vacuum cleaner having a nozzle 22 with a powered rotary brush, as well as other cleaning attachments (not shown). In operation, dust-laden air is drawn into canister 24 and collected in bag 25 after passing through nozzle 22 (or other attachment), wand 26, handle 28, and hose 30. The handle 28 has an electronic control panel 32 that allows the user to select various vacuum cleaner functions.

Figure 2:
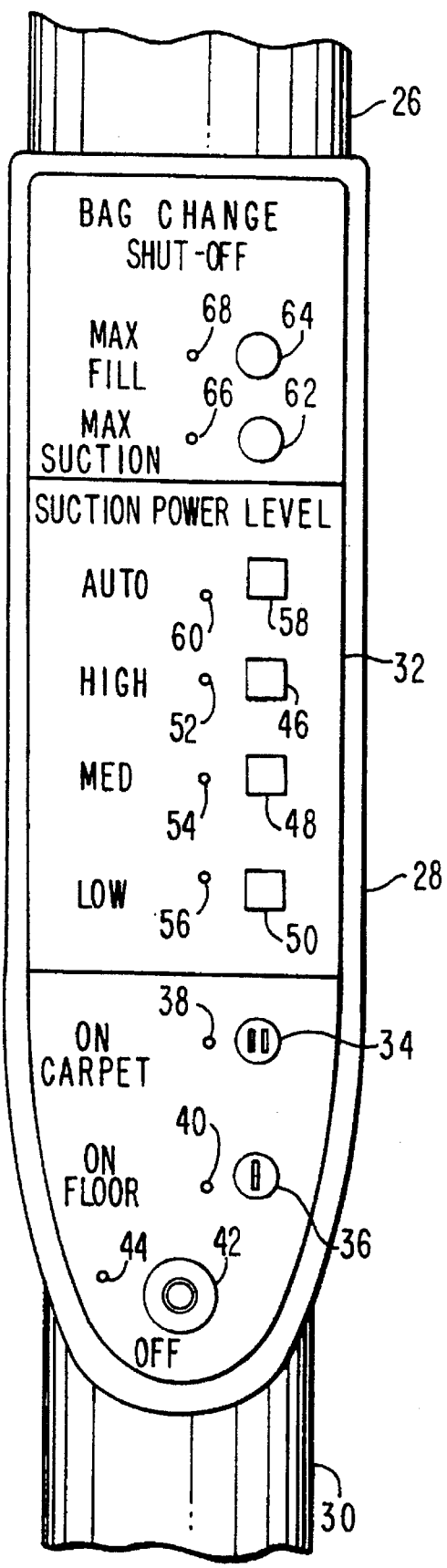
FIG. 2 is a top view of a portion of the handle of the vacuum cleaner of FIG. 1, showing the vacuum cleaner control panel.

Electronic control panel 32 is shown in more detail in FIG. 2. The user can turn on the vacuum cleaner 20 by pressing either ON (CARPET) switch 34 or the ON (FLOOR) switch 36. If ON (CARPET) switch 34 is pressed, the suction motor of vacuum cleaner 20 is turned on and the power brush in nozzle 22 is turned on, so that a carpet may be cleaned effectively. If ON (FLOOR) switch 36 is pressed, the suction motor of vacuum cleaner 20 is turned on, but the power brush in nozzle 22 remains off, so that a bare floor can be cleaned. ON (FLOOR) switch 36 is also preferably used when other attachments are used in place of nozzle 22, to avoid energizing the conductors in wand 26 unnecessarily. Indicator light 38 is lit when ON (CARPET) switch 34 is depressed and indicator light 40 is lit when ON (FLOOR) switch 36 is depressed. After the carpet or floor has been cleaned, vacuum cleaner 20 may be turned off using OFF switch 42. If vacuum cleaner 20 is plugged into an active power outlet, indicator light 44 is lit to show that the vacuum cleaner is ready to be turned on, even though presently off.

The user may manually select the desired vacuum cleaner power setting by depressing HIGH switch 46 for high power, MED switch 48 for medium power, or LOW switch 50 for low power. Indicator lights 52, 54, and 56 are used to indicate which power setting has been selected. The default power setting is high power. The electronic control system of vacuum cleaner 20 also supports an automatic mode in which the control system automatically adjusts the power setting. The automatic mode may be invoked by pressing AUTO switch 58. When vacuum cleaner 20 is in the automatic mode, indicator light 60 is lit.

Another user-selectable feature is the bag-change mode. If the user presses MAX SUCTION switch 62, the electronic control system of vacuum cleaner 20 will shut off vacuum cleaner 20 when the vacuum cleaner suction power has been discernibly degraded. If MAX FILL switch 64 is pressed, the electronic control system of vacuum cleaner 20 will shut off vacuum cleaner 20 only after the bag has filled to the maximum extent allowable. Indicator lights 66 and 68 light to indicate whether the maximum suction or the maximum fill mode has been selected.

Figure 3:
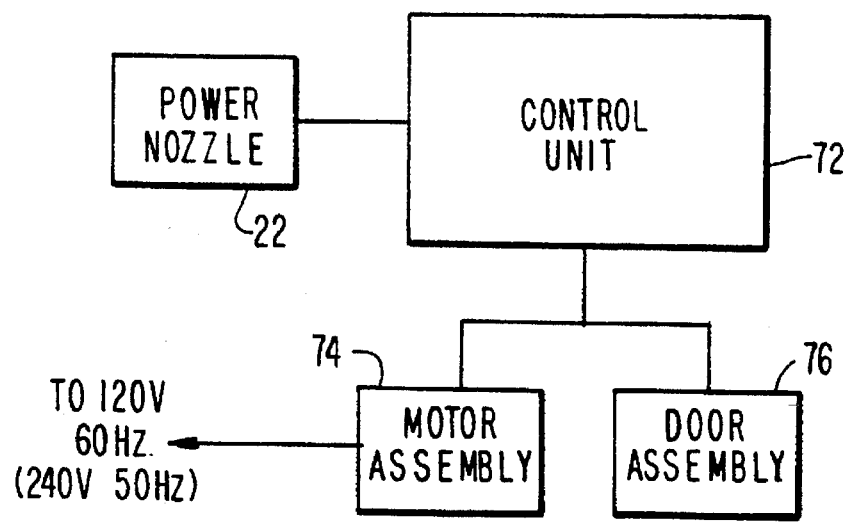
FIG. 3 is a schematic diagram of an illustrative embodiment of the electronic control system of the present invention.

A schematic block diagram of electronic control system 70 is shown in FIG. 3. A central component of electronic control system 70 is control unit 72, which is mounted in handle 28. In addition to a microprocessor or microcontroller for executing control routines, control unit 72 contains the circuitry necessary to provide an interface with the user, including the switches and indicators and accompanying circuitry of electronic control panel 32. Control unit 72 also contains circuitry for controlling the power to nozzle 22 and the vacuum cleaner suction motor in motor assembly 74. Additional circuitry within control unit 72 is used to receive signals from various sensors in door assembly 76. Both motor assembly 74, which contains the vacuum cleaner suction motor, and door assembly 76, are contained within vacuum cleaner canister 24.

Figure 4:
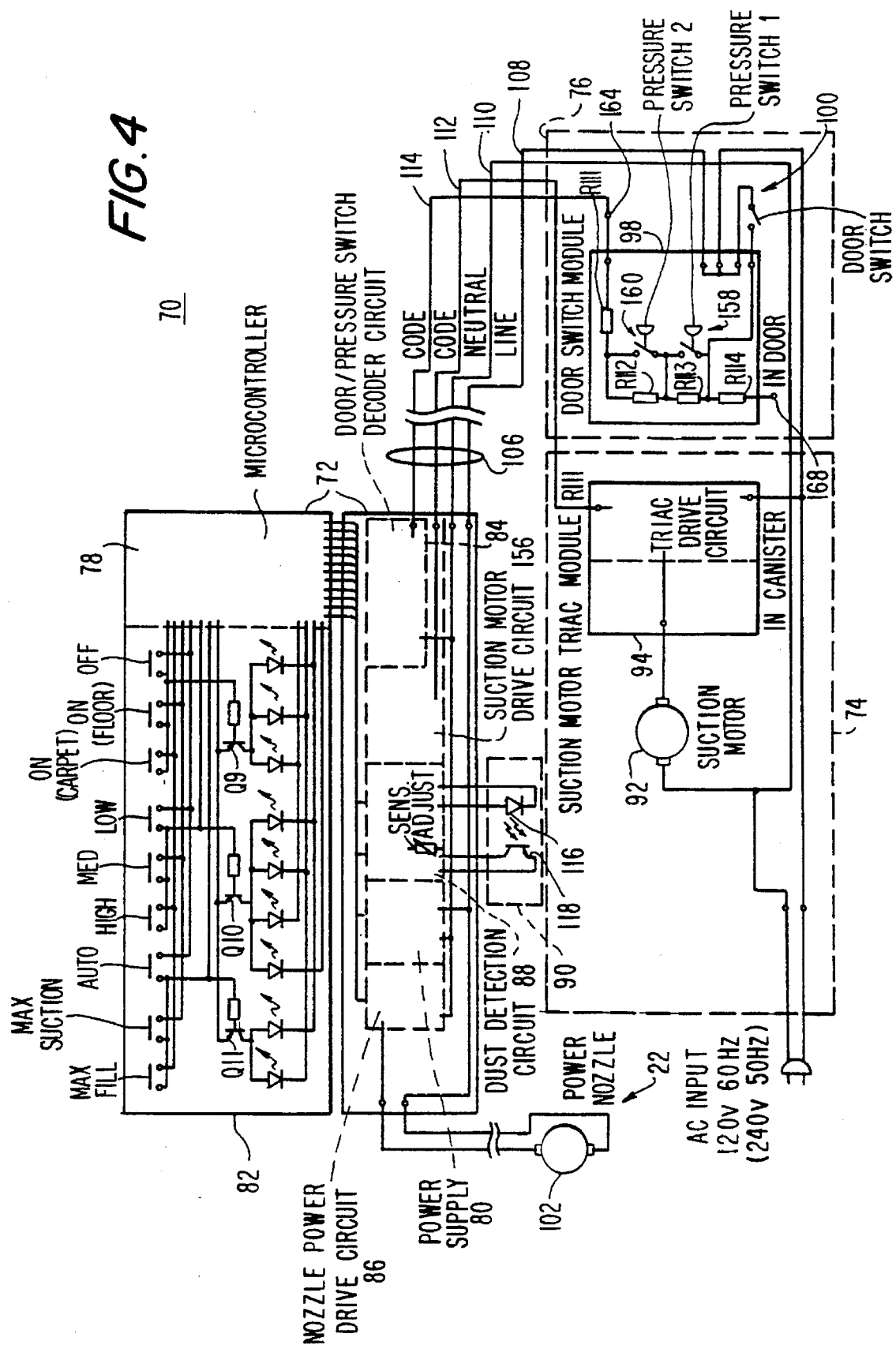
FIG. 4 is a logic circuit diagram of an illustrative embodiment of the electronic control system of the present invention.

The various mechanical and electrical components of electrical control system 70 are shown in more detail in FIG. 4. As shown in FIG. 4, control unit 72 contains microcontroller 78, power supply 80, control switch and indicator circuitry 82, decoder circuit 84, power nozzle control circuit 86, and dust detection circuit 88. Attached to the dust detection circuit 88 is dust sensor 90. Control unit 72 further includes suction motor drive circuit 156. Motor assembly 74 contains suction motor 92 and triac module 94. Door assembly 76 contains door switch module 98 and door switch 100. Power nozzle 22 contains nozzle motor 102 for driving the nozzle brush (not shown).

Control unit 72 is connected to motor assembly 74 and door assembly 76 by wires 106, which are contained within hose 30 (FIG. 1). Line wire 108 and neutral wire 110 are used to carry power from the AC input throughout the electronic control system 70. Code wires 112 and 114 and neutral wire 110 support two-way communications between control unit 72 and the motor and door assemblies 74 and 76. Code wire 112 (with neutral wire 110) carries control signals from control unit 72 to motor assembly 74. Code wire 114 (with neutral wire 110) is used to carry encoded signals from the encoding circuitry of door assembly 76 to control unit 72 when the hose 30 is connected to intake port 162 (FIG. 1). In this configuration, code wire 114 is connected to door assembly 76 via terminal 164. As will be described in more detail below, when hose 30 is connected to blow port 166 (FIG. 1), code wire 114 is connected to door assembly 76 via terminal 168.

Microcontroller 78 has on-board memory that contains routines that allow microcontroller 78 to control the power that is applied to nozzle motor 102 and suction motor 92 in response to input signals received from the switches on electronic control panel 32 and various sensors. Microcontroller 78 monitors the state of the switches in the switch and indicator circuitry 82 to determine which mode of operation has been selected by the user. For example, when ON (CARPET) switch 38 has been pressed, microcontroller 78 applies power to nozzle motor 102 and suction motor 92. Microcontroller 78 receives encoded signals from door assembly 76, which indicate whether the bag should be changed or whether the door is open. In the automatic mode of operation, microcontroller 78 determines the appropriate power setting for suction motor 92 based on the frequency with which dust particles are detected to be flowing through handle 28.

Vacuum cleaner 20 preferably operates at discrete power settings: low (75 $V_{RMS}$), medium (90 $V_{RMS}$), medium-high (105 $V_{RMS}$—not available manually), or high (120 $V_{RMS}$). When the high power setting is selected, the medium power preferably will initially be applied followed by a smooth increase over a period of approximately 0.5 s to the high setting, thereby avoiding a current surge. When operating automatically, microcontroller 78 preferably adjusts the vacuum cleaner power setting, initially setting the vacuum cleaner power to "low". When the number of dust particles being drawn into the vacuum cleaner per unit time is more than a predetermined amount, the vacuum cleaner power preferably is raised to the next highest setting after a predetermined delay. When there is a predetermined decrease in the number of dust particles being drawn into the vacuum cleaner per unit time, the next lowest setting preferably is selected after a predetermined delay.

Figure 5:
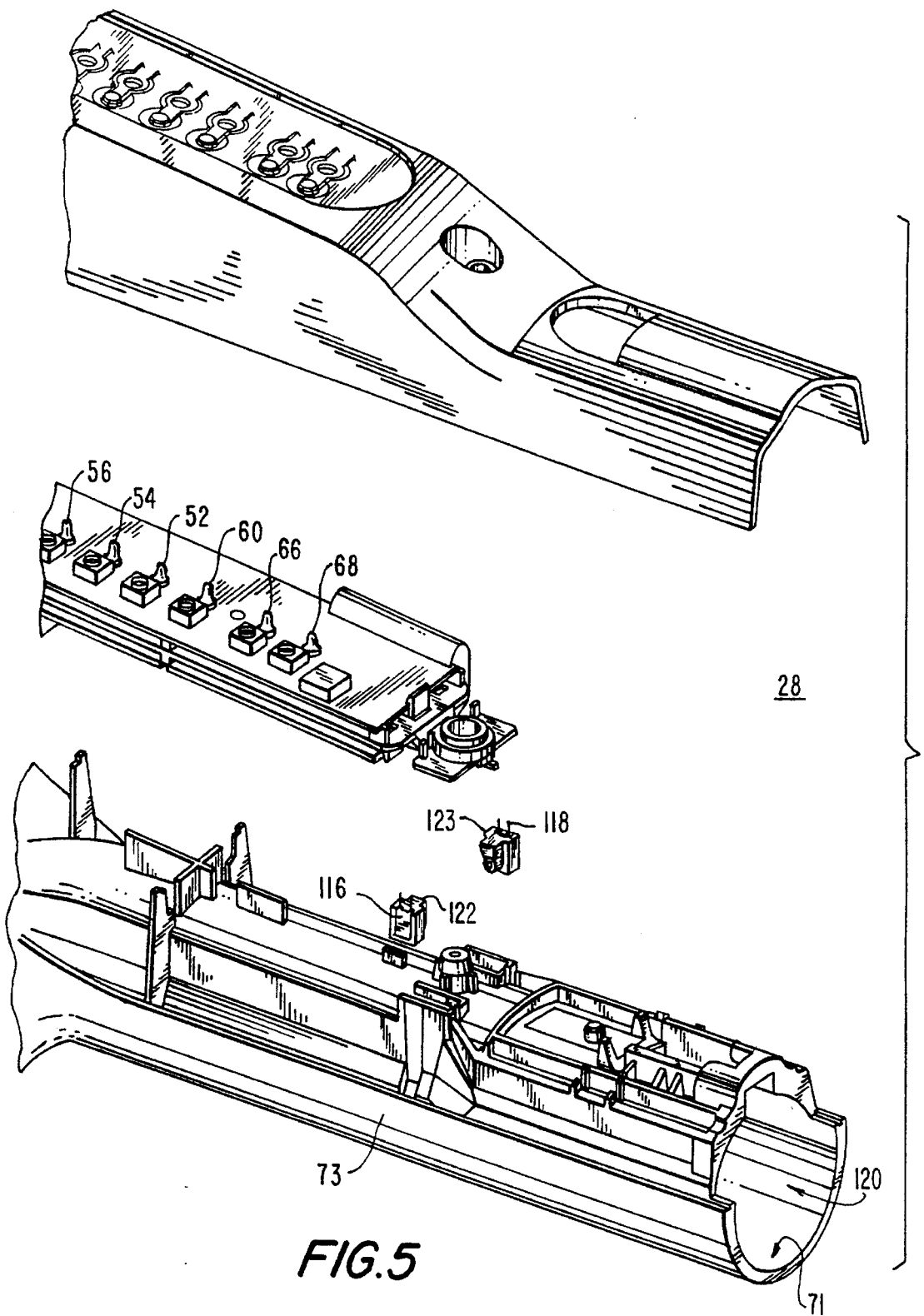
FIG. 5 is an exploded perspective view of a portion of the handle of the vacuum cleaner of FIG. 1.

In order to measure the dust flow, vacuum cleaner 20 preferably uses optical dust sensor 90 to generate a signal proportional to the number of dust particles that are drawn into vacuum cleaner 20 per unit time. As shown in FIG. 5, dust sensor 90 preferably has a light source—light-emitting diode 116—and a photodetector—phototransistor 118, which are preferably mounted on opposite sides of an air passageway 120, which extends through handle 28. Preferably, light-emitting diode 116 is an inexpensive emitter, such as Part No. IRL 80A, available from Siemens Components Corporation of Cupertino, Calif. Phototransistor 118 is preferably an inexpensive high-sensitivity phototransistor, such as Part No. LPT-80A, also available from Siemens Components Corporation.

Inner surface 71 of handle 28 defines the air passageway 120. Preferably, there is sufficient space in handle 28 between inner surface 71 and outer surface 73, to allow the light-emitting diode 116 and the phototransistor 118 to fit between the inner surface 71 and the outer surface 73, without having to form unsightly protrusions on the outer surface 73 to accommodate the light-emitting diode 116 and the phototransistor 118.

Light-emitting diode 116 is preferably mounted in a lens unit 122. Phototransistor 118 may preferably be mounted in an identical lens unit 123. Lens units 122 and 123 are preferably a one-piece components that are not only used to hold the light-emitting diode 116 and phototransistor 118, but also contain integrally formed lenses for focusing the light.

Lens unit 122 is used to focus the light emitted from light-emitting diode 116 toward phototransistor 118. When the light from the light-emitting diode 116 reaches lens unit 123, it is focused onto the phototransistor 118 by lens unit 123. Using lens unit 122 reduces the diameter of the emitted light beam as it impinges the lens unit 123 from approximately 0.4 inches (1 cm) to approximately (0.08 inches (2 mm). Lens unit 123 further focuses the beam onto phototransistor 118. Preferably, lens units 122 and 123 are formed from an optical-grade polycarbonate, which transmits light at least in a wavelength range of about 800 nm to 1000 nm.

Figure 6:
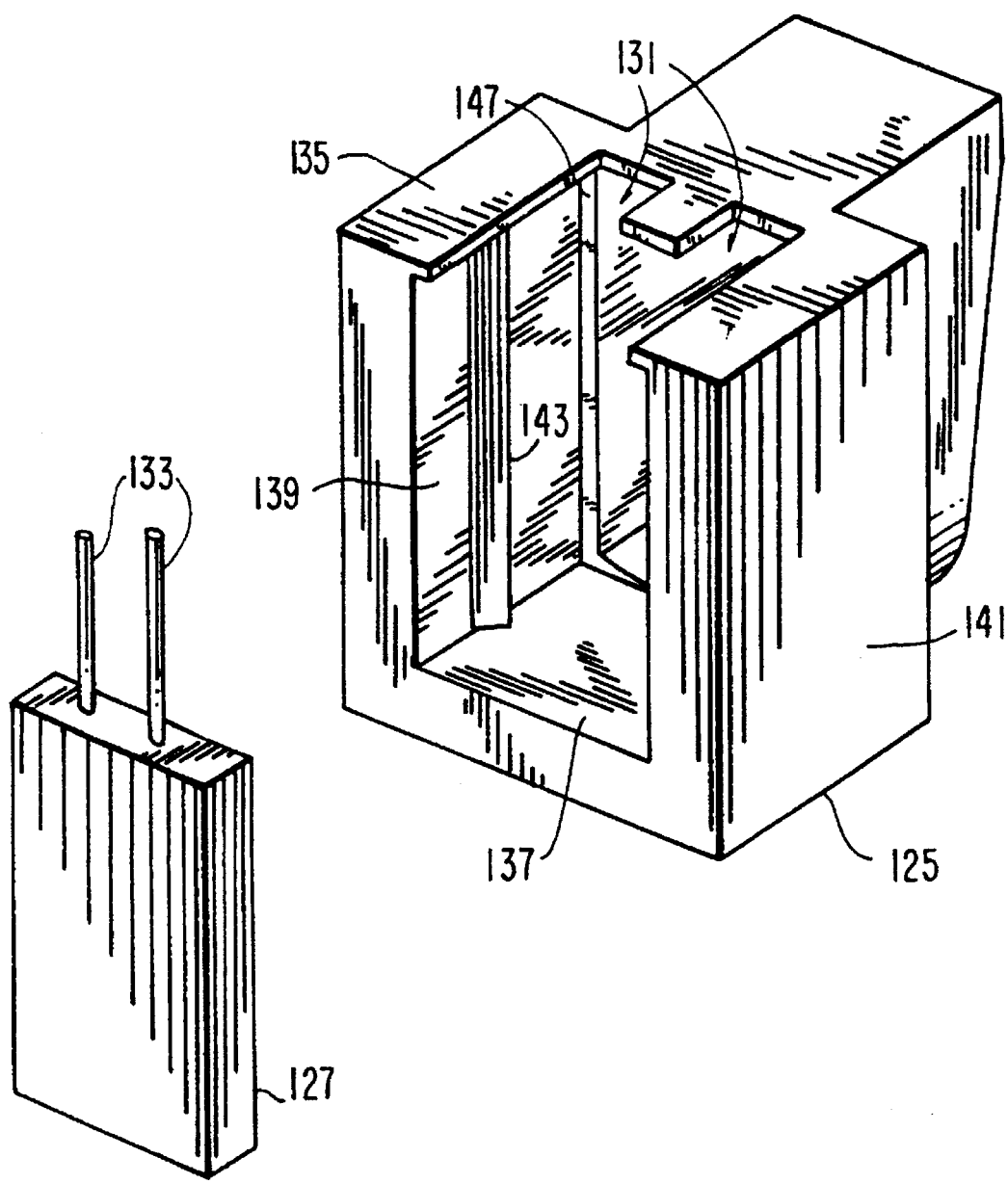
FIG. 6 is a perspective view of an illustrative optical device and a lens unit.
Figure 7:
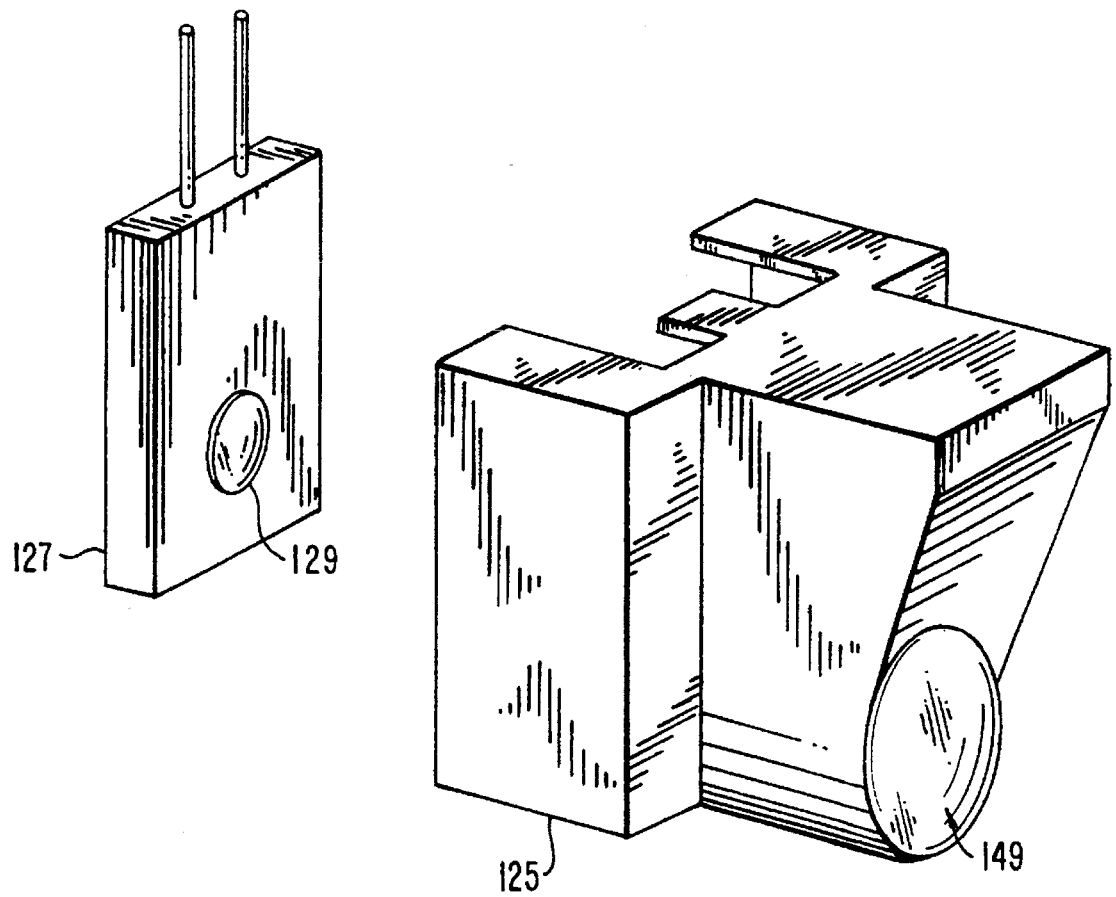
FIG. 7 is a further perspective view of the illustrative optical device and lens unit shown in FIG. 6.

An illustrative lens unit is shown in more detail in FIGS. 6 and 7, which also show optical device 127, which can be either light emitting diode 116 or phototransistor 118. If optical device 127 is a light emitting diode, light is emitted via a hemispherical lens 129 that is part of the packaged optical device 127. If optical device 127 is a phototransistor 118, light is received via the hemispherical lens 129.

As shown in FIG. 6, upper wall 135 has slots 131 that accommodate the leads 133 of optical device 127, when optical device 127 is mounted in lens unit 125. Upper wall 135 and lower wall 137 restrict vertical motion of optical device 127 with respect to lens unit 125. Side walls 139 and 141 restrict lateral horizontal motion. Preferably, the optical device 127 can be mounted in lens unit 125 by snapping the optical device 127 into place. Lens unit 125 has wedge-shaped ridge 143, which biases optical device 127 against ridge 147 after optical device 127 is snapped into place past the ridge 143.

Figure 8:
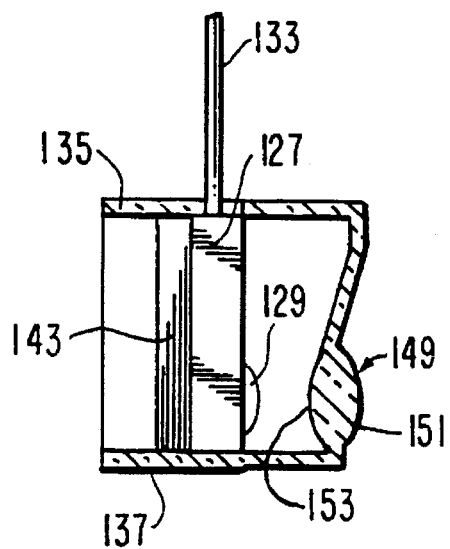
FIG. 8 is a cross-sectional side view of the optical device and lens unit of FIGS. 6 and 7, shown with the optical device mounted inside the lens unit.

Lens unit 125 preferably has an integrally formed lens 149, which is shown in cross-section in FIG. 8. Lens 149 preferably has a first face that has a radius of curvature of approximately 0.24 inches (0.6 cm) and a second face that has a radius of curvature of approximately 0.115 inches (0.3 cm). As shown in FIG. 8, lens 129 and lens 149 are separated by an air gap. Preferably this gap is approximately 0.018 inches (0.5 mm).

Figure 9:
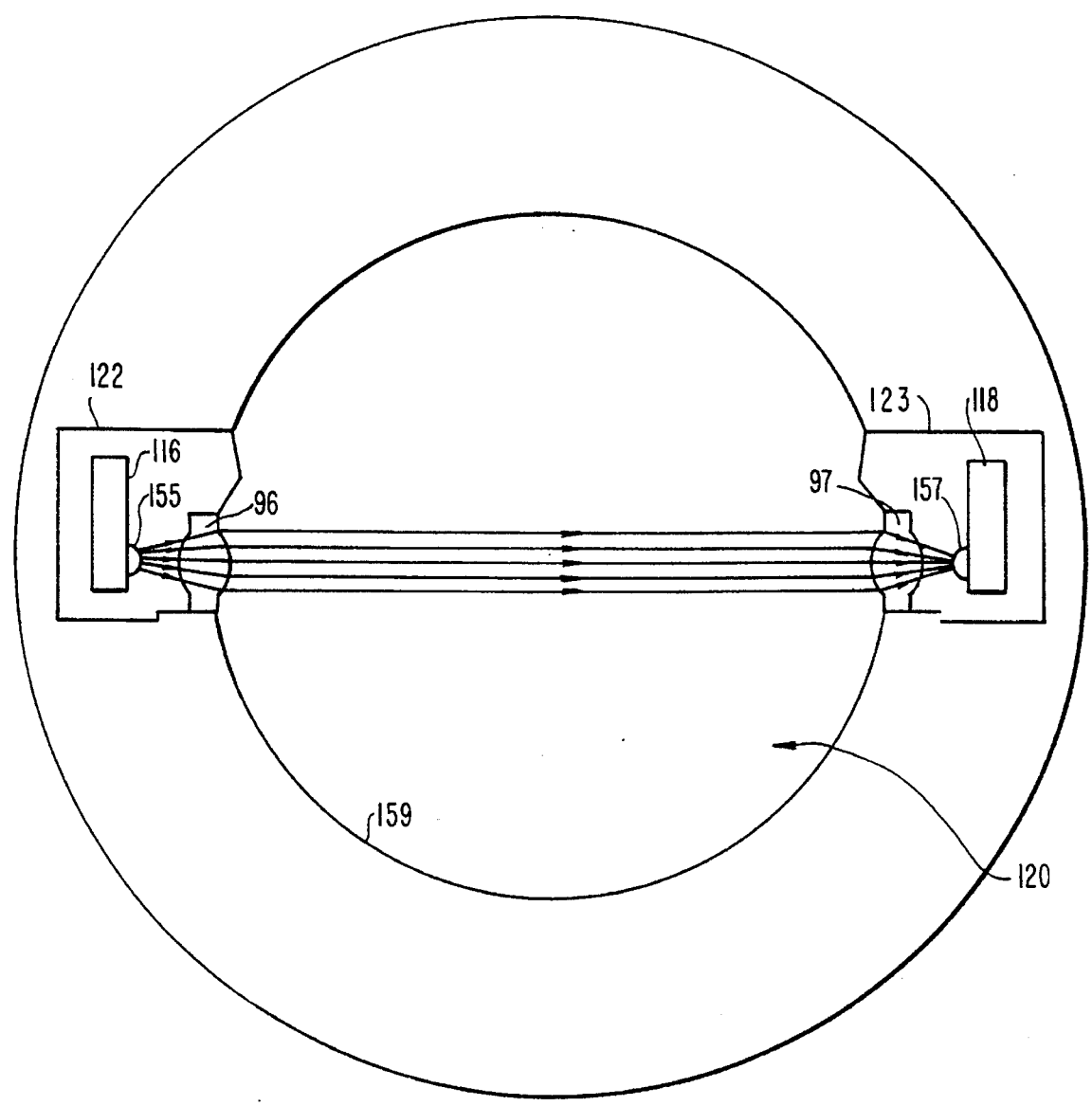
FIG. 9 is a cross-sectional view of a portion of the handle of the vacuum cleaner of FIG. 1 showing the optical path of light emitted from the light-emitting diode.

The path of the light emitted from light-emitting diode 116 across passageway 120 is shown in FIG. 9. The diameter of passageway 120 is preferably approximately 1.25 inches (3 cm). Light exits lens 155 of light-emitting diode 116 and passes through lens portion 96 of lens unit 122, which focuses the light toward phototransistor 118. When the light reaches lens unit 123, lens portion 97 of lens unit 123 focuses the light onto the light-sensitive portion of phototransistor 118 via hemispherical lens 157. As shown in FIG. 9, the lens units 122 and 123 are mounted so that the lens portions 96 and 97 of these devices are flush with inner surface 159 of passageway 120.

Figure 10:
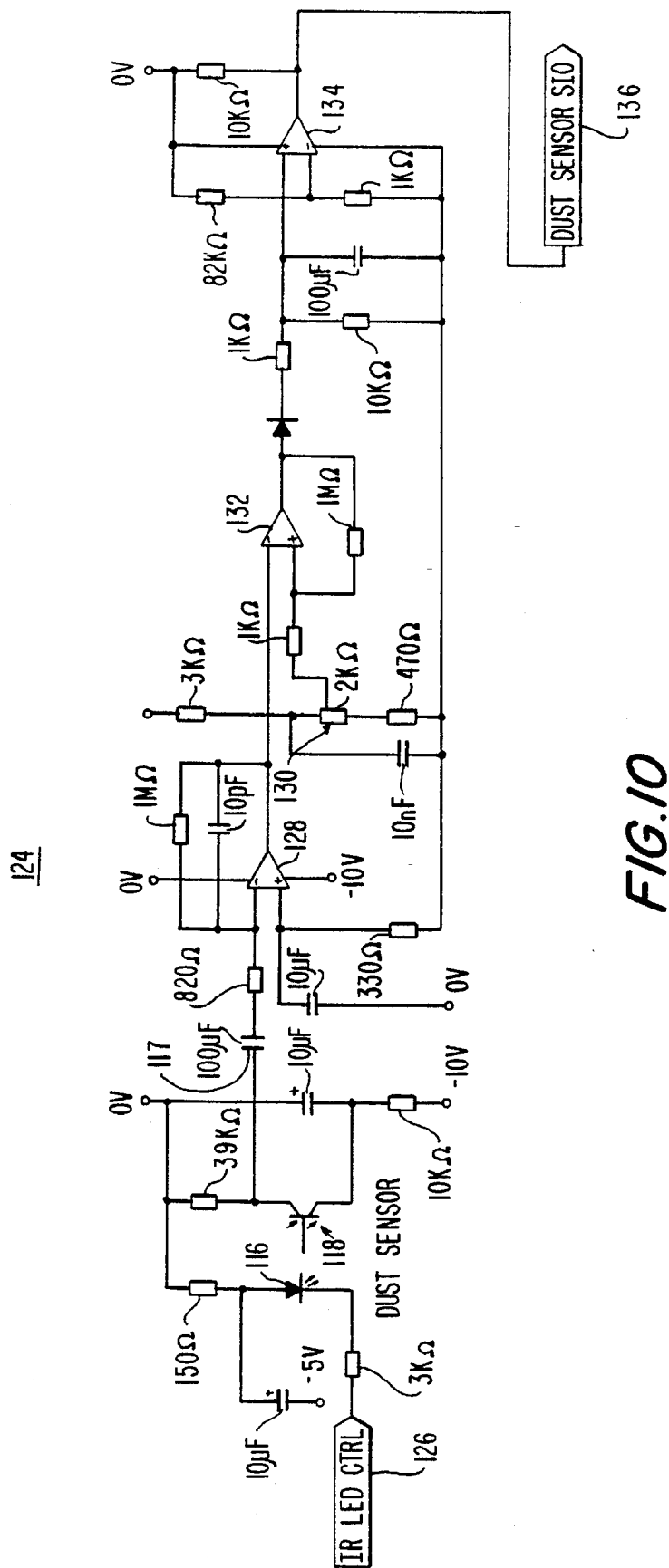
FIG. 10 is a circuit diagram of an illustrative embodiment of a portion of the electronic control system used to process signals from the dust sensor.

In automatic mode, light is emitted by light-emitting diode 116 at a constant intensity. As shown in FIG. 10, the intensity of the light emitted by light-emitting diode 116 is controlled by microcontroller 78 (FIG. 4) via control terminal 126. The light emitted by light-emitting diode 116 is received by phototransistor 118, which generates corresponding phototransistor output signals. When a dust particle passes between light-emitting diode 116 and phototransistor 118, the intensity of the light from light-emitting diode 116 that is received by phototransistor 118 is momentarily reduced, causing the phototransistor output signal to drop.

Preferably, the dust detection circuit 88 (FIG. 4) contains a two-stage analog amplifier 124, as shown in FIG. 10. Two-stage analog amplifier 124 processes the phototransistor output signals, so that microcontroller 78 (FIG. 4) can recognize the flow rate of the particles being drawn through passageway 120. The phototransistor output signal from phototransistor 118 preferably is passed to amplifier 128 via capacitor 117, which blocks low-frequency signal transients, such as those occurring more slowly than approximately 1 ms. Because capacitor 117 blocks low-frequency signals, two-state analog amplifier 124 effectively detects the leading edges of the signals produced as dust particles pass between light-emitting diode 116 and phototransistor 118. (In the event that a very large particle is drawn between light-emitting diode 116 and phototransistor 118, both the leading and trailing edges may be detected.) As the leading edge of a particle passes between light-emitting diode 116 and phototransistor 118, the intensity of the light from light-emitting diode 116 that is received by phototransistor 118 is abruptly reduced. This transient signal is passed to amplifier 128 via capacitor 117. (When the trailing edge of a large particle passes light-emitting diode 116 and phototransistor 118, the intensity of the light from light-emitting diode 116 that is received by phototransistor 118 rises abruptly and this transient phototransistor signal is also passed to amplifier 128.)

The transient signals that are received by amplifier 128 are amplified and passed to comparator 132. If the amplified output of phototransistor 118 exceeds the threshold set by resistor 130, comparator 132 will generate a corresponding output pulse, which is strengthened to a level sufficient to be received by microcontroller 78 by output amplifier 134. The processed phototransistor output signal is provided to microcontroller 78 via output terminal 136.

Figure 11:
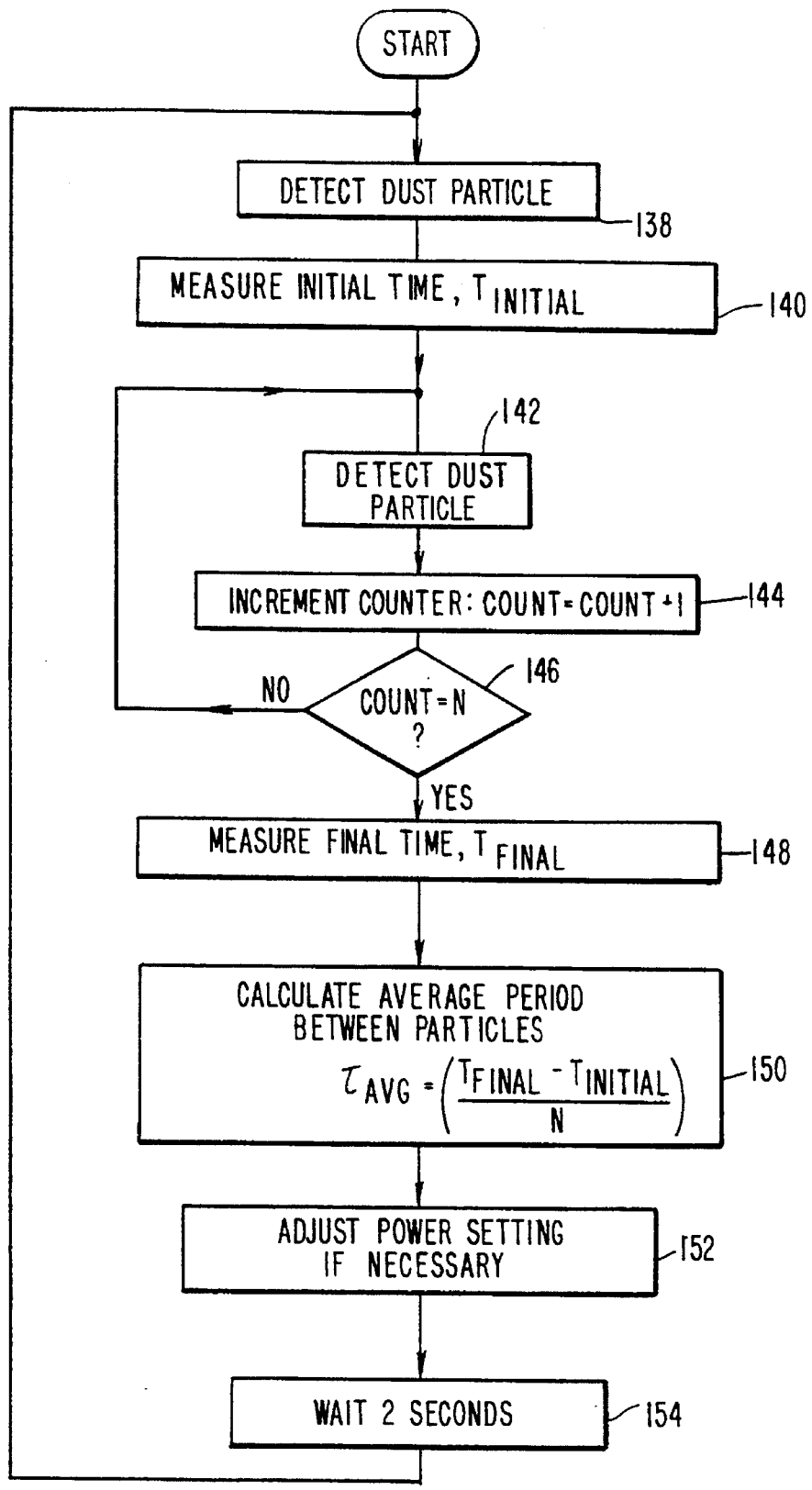
FIG. 11 is an illustrative flow chart showing the logical flow of the routines executed by the control unit of the electronic control system of the present invention.

Microcontroller 78 preferably measures the average time period between dust particle edge detections, which generally corresponds to the average time period between detected dust particles. The microcontroller 78 measures this time period as shown in FIG. 11. At step 138, two-stage analog amplifier 124 detects a dust particle and generates an output pulse. Microcontroller 78 measures an initial time, $T_{INITIAL}$, at step 140 using an internal clock. After detecting another dust particle at step 142, microcontroller 78 increments a counter at step 144 to reflect that a dust particle was detected at step 142. At test 146, microcontroller 78 tests to determine whether the count is equal to a predetermined limit, N, where N is preferably 20 (at step 140, the value of count is zero). If the count is not equal to N, control loops back to step 142, until another dust particle is detected. After repeatedly looping through steps 142 and 144 and test 146, the count will equal N, and microcontroller 78 will measure the final time, $T_{FINAL}$, at step 148. The average period of time elapsed between the detection of each of the dust particles, $\tau_{AVG}$, is calculated by microcontroller 78 at step 150. Microcontroller 78 then adjusts the power setting of vacuum cleaner 20 at step 152, if necessary. Preferably, if $\tau_{AVG}$ is greater than 9 ms, the low power setting is chosen. If $\tau_{AVG}$ is between 7 and 9 ms, the medium power setting preferably is chosen. When $\tau_{AVG}$ is between 5 and 7 ms the medium-high setting preferably is used. For values of $\tau_{AVG}$ less than 5 ms, the highest power setting preferably is selected. After adjusting the power setting, microcontroller 78 preferably waits at step 154 for a predetermined time, for example, two seconds, before looping back to step 138. The two second delay ensures that microcontroller 78 does not adjust the power setting too frequently.

Microcontroller 78 preferably controls the power delivered to suction motor 92 using a conventional triac module 94, as shown in FIG. 4. Triac module 94 applies power to suction motor 92 from line wire 108 and neutral wire 110 in response to control signals that are generated by suction motor drive circuit 156 under the direction of microcontroller 78. The control signals from suction motor drive circuit 156 are provided to triac module 94 via code wire 112 and neutral wire 110. Microcontroller 78 preferably determines whether or not power is delivered to nozzle motor 102 using a conventional triac circuit contained within power nozzle drive circuit 86.

Door assembly 76 (FIGS. 4 and 12) preferably contains various sensors for measuring parameters that are related to the operation of vacuum cleaner 20, such as whether or not bag 25 is present, the pressure drop across bag 25 (FIG. 1), and the state of door 174 (open or closed). Control unit 72 preferably monitors the outputs of the sensors and controls the power applied to suction motor 92 and nozzle motor 102 in response. If desired, additional sensors can be provided, either in door assembly 76 or elsewhere, to monitor motor temperature, motor speed, airflow rate, etc., and react accordingly.

In order to determine whether the vacuum cleaner bag should be changed, door assembly 76 preferably contains two normally open vacuum pressure switches 158 and 160 that monitor the differential pressure across the bag (i.e. from just before the bag inlet to the exhaust side of the bag). As the bag fills, the bag becomes clogged with dust, causing the magnitude of the pressure drop across the bag to increase. When the pressure drop exceeds a first threshold level—for example, 42 inches of water—vacuum switch 158 closes, which alters the voltage provided to decoder circuit 84 in control unit 72 via code wire 114 and neutral wire 110. By decoding the value of this voltage, microcontroller 78 can determine that the pressure drop has exceeded the first threshold. If the "maximum suction" mode has been selected, microcontroller 78 shuts off the power to suction motor 92 at this point. If, however, the "maximum fill" mode has been selected, the bag is allowed to fill until the pressure drop exceeds a second threshold level—for example, 57 inches of water. When the second threshold is exceeded, vacuum switch 160 closes, which further alters the voltage provided to decoder circuit 84 in control unit 72. In response, microcontroller 78 shuts off power to suction motor 92, because suction power is substantially degraded whenever the pressure drop across the bag is greater than 57 inches of water.

Figure 12:
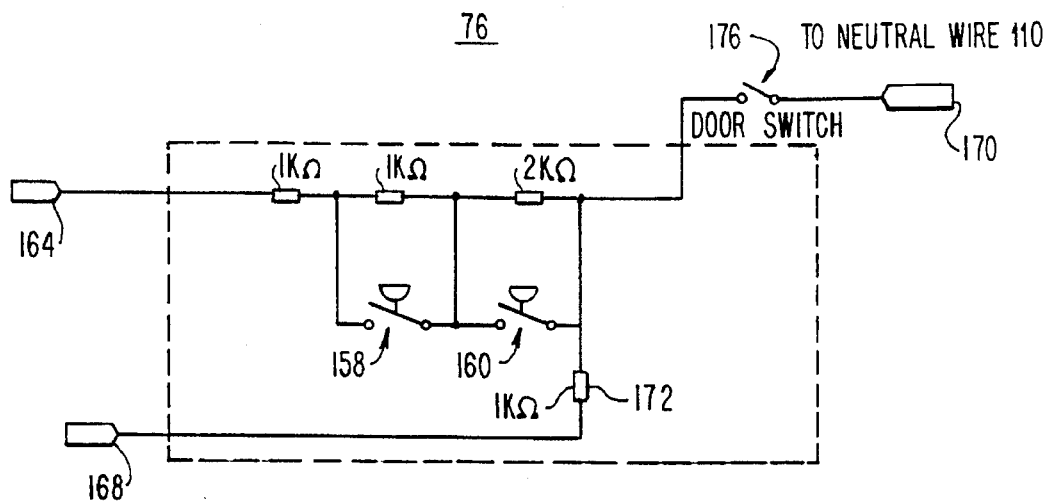
FIG. 12 is a circuit diagram of an illustrative embodiment of a portion of the circuitry used to encode sensor data.

The circuitry of door assembly 76 is shown in more detail in FIG. 12. When hose 30 is connected to intake port 162 (FIG. 1), code wire 114 connects to terminal 164 in intake port 162, whereas when hose 30 is connected to blow port 166 (FIG. 1), code wire 114 is connected to terminal 168 in blow port 166. When hose 30 is connected to intake port 162, the pressure drop across the bag of vacuum cleaner 20 is monitored by vacuum switches 158 and 160. If the pressure drop exceeds 42 inches of water, vacuum switch 158 will close, which changes the resistance between terminal 164 and terminal 170 from 4 kΩ to 3 kΩ. This change is detected by decoder circuit 84, so that if vacuum cleaner 20 is in the maximum suction mode, power to suction motor 92 can be shut off and indicator light 66 can be repeatedly turned on and off (FIG. 4). When the pressure drop across the bag exceeds 57 inches of water, vacuum switch 160 closes, so that the resistance between terminal 164 and terminal 170 drops to 1 kΩ. The decoder circuit 84 detects this change and, if vacuum cleaner 20 is in the maximum fill mode, power is shut off to suction motor 92 and indicator light 68 is repeatedly turned on and off.

In addition to connecting code wire 114 to terminal 168 in blow port 166 when hose 30 is connected to blow port 166, code wire 112, neutral wire 110, and line wire 108 in hose 30 are also connected to motor assembly 74 and door assembly 76 in the same way that these wires are connected when hose 30 is connected to intake port 162. By providing a blow port 166 that allows a full set of electrical connections to be made between wires 106 and motor assembly 74 and door assembly 76, the user can control vacuum cleaner 20 using electronic control panel 32 on handle 28, even when the vacuum cleaner 20 is being used in the blow port mode.

When the hose 30 is connected to blow port 166, the resistance between code wire 114 and neutral wire 110 will be 1 kΩ (the resistance of resistor 172). If a resistance of 1 kΩ is detected before power is applied to suction motor 92, microcontroller 78 will recognize that blow port 166 is in use and will only allow OFF switch 42, LOW switch 50, MED switch 48, and HIGH switch 46 to be operational. When using the blow port 166, it is only necessary to press LOW switch 50, MED switch 48, or HIGH switch 46 to turn on the vacuum cleaner 20. The OFF switch 42 can be used to turn off the vacuum cleaner 20, as usual. The remaining switches, MAX FILL switch 64, MAX SUCTION switch 62, AUTO switch 58, ON (CARPET) switch 34, and ON (FLOOR) switch 36, are disabled. Further, microcontroller 78 directs power nozzle drive circuit 86 to cut off power normally supplied to the nozzle 22, so that the electrical terminals of handle 28 that are used to connect handle 28 to wand 26 and nozzle 22 are not needlessly energized.

Door switch 176 is mounted on door 174 (FIG. 1) so that when door 174 is closed and bag 25 is in place, a flat portion of bag 25 will bias door switch 176 into a closed position. When either door 174 is open or bag 25 is missing, door switch 176 will return to a normally-open position. When microcontroller 78 detects that door switch 176 is open, no power will be applied to suction motor 92 (FIG. 1) to prevent damage to suction motor 92 from foreign objects entering through the area of the door 174. Indicator light 44 will also be repeatedly turned on and off.

Figure 13:
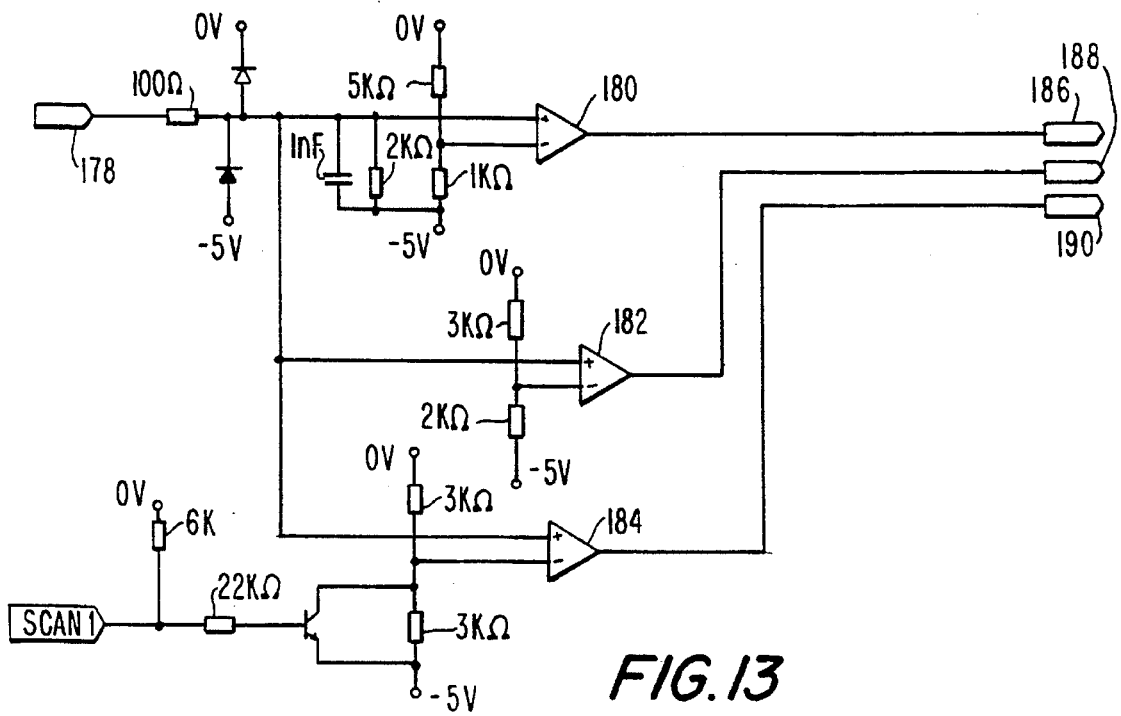
FIG. 13 is a circuit diagram of an illustrative embodiment of a portion of the circuitry used to decode sensor data that is encoded by the circuitry shown in FIG. 12.

The decoder circuit 84, which determines the state of vacuum switches 158 and 160 and door switch 176, is shown in more detail in FIG. 13. Terminal 178 is connected to code wire 114, which is connected to either terminal 164 or 168 (FIG. 12), depending on whether hose 30 is attached to intake port 162 or blow port 166. Comparators 180, 182, and 184 are connected to terminal 178, so that the voltage on terminal 178, which is indicative of the resistance between terminal 170 and either terminal 164 or 168 (FIG. 12), can be monitored. The outputs of comparators 180, 182, and 184 are provided to microcontroller 78 via terminals 186, 188, and 190, respectively.

If door switch 176 (FIG. 12) is open, outputs 186, 188, and 190 are low. Whenever output 186 is low, it will be apparent to microcontroller 78 that door 174 is open, so that the power to vacuum cleaner 20 can be shut off. Output 186 is high when door 174 is closed. Output 188 is high whenever vacuum switch 158 is closed, indicating that the pressure drop across the vacuum cleaner bag is greater than 42 inches of water. Output 190 is high whenever vacuum switch 160 is closed, which occurs when the pressure drop across the bag is greater than 57 inches of water. If microcontroller 78 senses that outputs 188 and 190 are high before power has been applied to suction motor 92, microcontroller 78 will be able to determine that hose 30 is connected to blow port 166 rather than intake port 162.

Figure 14:
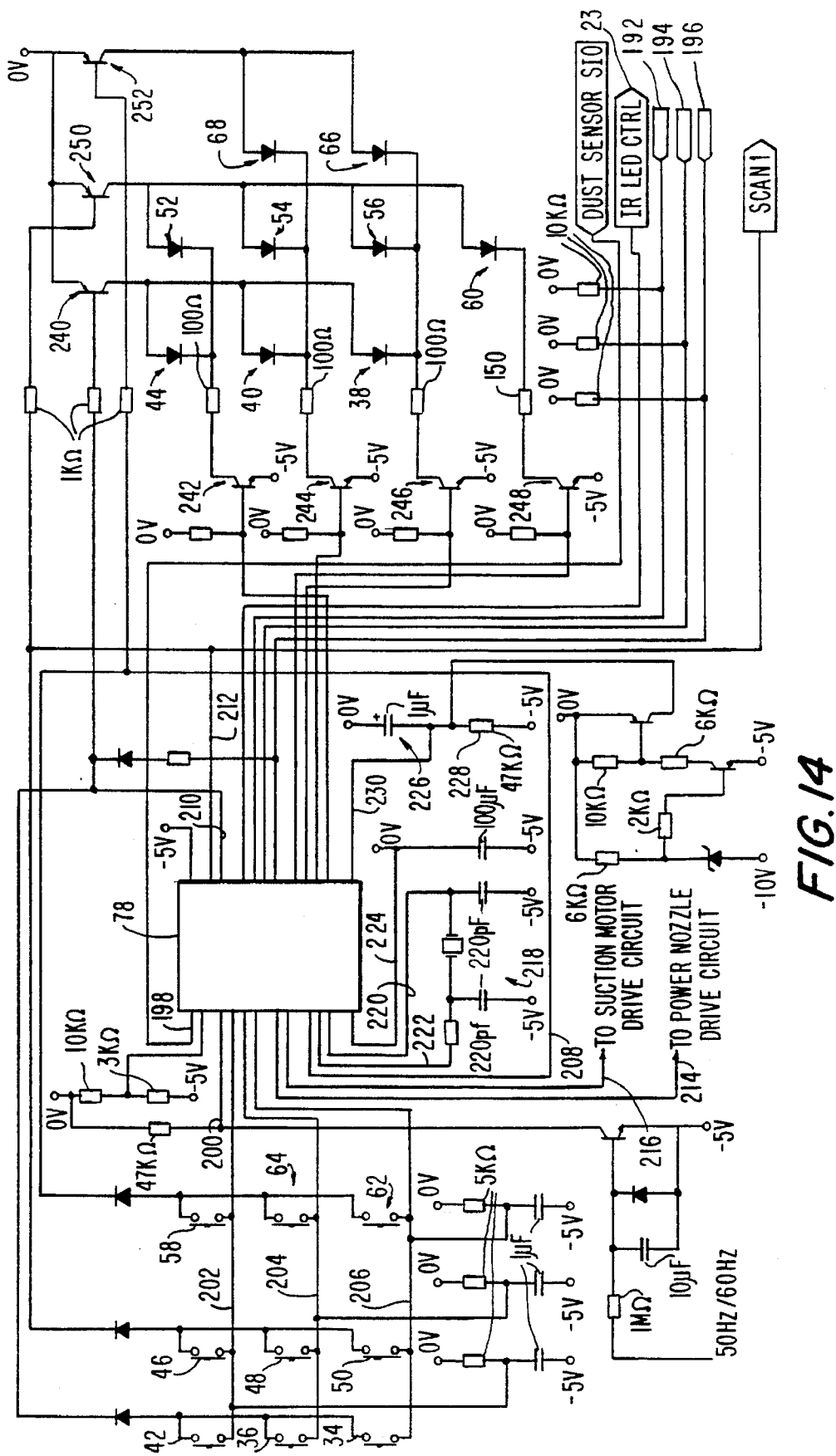
FIG. 14 is a circuit diagram showing the use of an illustrative microcontroller.

Microcontroller 78 receives the signals provided at outputs 186, 188, and 190 (FIG. 13) at inputs 192, 194, and 196, respectively (FIG. 14). One of the advantages of the arrangement of electronic control system 70 is that because microcontroller 78 is located in handle 28 (FIG. 1) rather than canister 24 (FIG. 1), few wires are required between handle 28 and canister 24. Specifically, it is only necessary to provide four wires 106 (FIG. 1) to support two-way communications between the motors and sensors in canister 24 and microcontroller 78 in handle 28, whereas if microcontroller 78 were located in canister 24 and the user-selectable switches and the indicator lights remained on handle 28, it would be necessary to run numerous wires between handle 28 and canister 24 to ensure that microcontroller 78 is adequately connected to each of the switches and indicator lights. Alternatively, it would be necessary to provide two microcontrollers, one each in canister 24 and handle 28. Another advantage of the arrangement of the electronic vacuum cleaner control system 70 is that dust sensor 90 is located in the handle, in close proximity to control unit 72. With this arrangement, it is not necessary to provide wires in hose 30 to relay dust sensor data to microcontroller 78, which would cause hose 30 to be needlessly complex and more expensive to manufacture.

Preferably, microcontroller 78 is a 4 bit microcontroller with 1024×8 bits of program memory and 64×4 bits of data memory, such as part No. μPD 7566, available from NEC Corporation of Japan. As shown in FIG. 14, microcontroller 78 monitors the pulses generated by dust detection circuit 88 at pin 198. Pin 200 is used to detect whether the input voltage on line wire 108 is positive or negative with respect to neutral wire 110, which allows microcontroller timing to be derived from the 50 or 60 Hz input voltage. (Operation at 50 or 60 Hz is a factory selectable option). Microcontroller 78 scans the switches 34, 36, 42, 46, 48, 50, 58, 62, and 64 each input voltage cycle using pins 202, 204, and 206, in conjunction with the scan outputs at pins 208, 210, and 212, to determine which switches have been pressed by the user. The states of switches 42, 36, and 34 are read while pin 210 is low and pins 212 and 208 are high. The states of switches 46, 48, and 50 are read while pin 212 is low and pins 210 and 208 are high. The states of switches 58, 64, and 62 are read while pin 208 is low and pins 210 and 212 are high.

The indicator lights preferably are controlled in a similar fashion. When pin 210 is low, transistor 240 is on and the status of indicator lights 44, 40, and 38 is determined by the states of transistors 242, 244, 246, and 248. When pin 212 is low, transistor 250 is on and the status of indicator lights 52, 54, 56, and 60 is determined by the states of transistors 242, 244, 246, and 248. When pin 208 is low, transistor 252 is on and the status of indicator lights 66 and 68 is determined by the states of transistors 242, 244, 246, and 248.

Pin 214 is used to control the power applied to nozzle motor 102 by power nozzle drive circuit 86. Pin 216 is used to direct suction motor drive circuit 156 to generate control signals that cause triac module 94 to apply the desired power to suction motor 92.

The output from clock oscillator 218 is supplied to microcontroller 78 via pins 220 and 222, which allows microcontroller 78 to execute control routines at a clock speed of 500 kHz. Power supply 80 of control unit 72 (FIG. 4), which supplies power to microcontroller 78 via pin 224, is preferably a conventional dual-voltage power supply circuit of the non-isolated type.

Capacitor 226 and resistor 228 form a reset delay circuit. When power is first applied to microcontroller 78, capacitor 226 discharges and microcontroller 78 is reset via pin 230. Pins 232, 234, and 236 of microcontroller 78 control indicator lights 38, 40, 44, 52, 54, 56, 66, and 68.

Whenever vacuum cleaner 20 is plugged into a live outlet, the status of dust sensor 90 is checked by repeatedly turning light-emitting diode 116 (FIG. 5) on and off using terminal 238, which is connected to control terminal 126 (FIG. 5). Microcontroller 78 attempts to detect each resulting pulse at terminal 200. If a pulse is missed indicating that the dust sensor 90 is obstructed by dust, microcontroller 78 will not enable the automatic mode. If the automatic mode is subsequently selected, indicator light 60 will be repeatedly turned on and off and power will be cut off to nozzle motor 102 and suction motor 92. Upon selecting one of the LOW, MED, or HIGH power settings, indicator light 60 will be extinguished. The automatic mode may, however, be selected after vacuum cleaner 20 has been turned off and the dust blocking dust sensor 90 has been cleared.

Thus it is seen that an improved electronic control system for a vacuum cleaner is provided in which a microcontroller-based control unit contained in the handle of the vacuum cleaner is connected to the canister by a wired hose, which supports two-way communications between the control unit and the suction motor and various sensors contained in the canister, thereby allowing a single microcontroller to be used, simplifying the construction of the unit. The vacuum cleaner can be placed in one of two user-selectable bag change modes: a maximum suction bag change mode, in which the vacuum cleaner shuts off when the pressure drop across the vacuum cleaner bag exceeds a predetermined threshold and a maximum fill bag change mode, in which the vacuum cleaner shuts off only after the pressure drop exceeds a higher threshold. The vacuum cleaner also has an optical dust sensor located in the handle of the vacuum cleaner, so that the vacuum cleaner can be placed in an automatic mode in which the power setting of the suction motor is adjusted based on the frequency with which dust particles are drawn past the sensor. The optical dust sensor is constructed from a light source and a photodetector, each of which is mounted in a lens unit having an integrally formed lens. Additionally, the vacuum cleaner has a blow port to which a vacuum cleaner hose can be attached and circuitry for detecting when the hose is connected to the blow port. One skilled in the art will appreciate that the present invention can be practiced by other than the described embodiments, which are presented for the purposes of illustration and not of limitation, and the present invention is limited only by the claims that follow.

What is claimed is:

1. A vacuum cleaner that operates in response to a plurality of settings comprising:
   a canister having a portion that defines an intake port;
   a suction motor within the canister for drawing air into the canister through the intake port;
   suction motor power control circuitry for supplying power to the suction motor;
   a hose connected to the intake port for directing the air to the intake port;
   a handle separate from the canister and connected to the hose;
   at least one sensor within the canister responsive to an operating characteristic related to the operation of the vacuum cleaner for generating a corresponding sensor signal;
   a control unit having the plurality of settings and being disposed within the handle for receiving the sensor signal from the at least one sensor in the canister and for generating a motor power control signal for controlling the suction motor power in response to the sensor signal and the settings; and
   a selection switch disposed within the handle and connected to the control unit for allowing a user to enter the settings; wherein:
   the hose contains wires that support two-way communications;
   the control unit is directly connected to the at least one sensor via the wires, for providing the sensor signal directly to the control unit; and
   the control unit is directly connected to the suction motor power control circuitry, for providing the motor power control signal directly to the suction motor power control circuitry.

2. The vacuum cleaner of claim 1, further comprising a vacuum cleaner bag within the canister, wherein the at least one sensor within the canister comprises first and second vacuum pressure switches for monitoring the pressure drop across the vacuum cleaner bag.

3. The vacuum cleaner of claim 2, wherein the first vacuum pressure switch closes when the pressure drop across the vacuum cleaner bag exceeds a first threshold value corresponding to a maximum suction mode level and the second vacuum pressure switch closes when the pressure drop across the vacuum cleaner bag exceeds a second threshold value corresponding to a maximum fill mode level, the first threshold value being smaller than the second threshold value.

4. A vacuum cleaner comprising:
   a canister having a portion that defines an intake port;
   a suction motor within the canister for drawing air into the canister through the intake port;
   a hose connected to the intake port for directing the air to the intake port;
   a handle separate from the canister and connected to the hose;
   at least one sensor within the canister responsive to an operating characteristic related to the operation of the vacuum cleaner for generating a corresponding sensor signal;
   a vacuum cleaner bag within the canister, wherein the at least one sensor within the canister comprises first and second vacuum pressure switches for monitoring the pressure drop across the vacuum cleaner bag; and a control unit disposed within the handle for receiving the sensor signal from the at least one sensor in the canister and for controlling the operation of the vacuum cleaner in response to the sensor signal; wherein:

the hose contains wires that support two-way communications;

the control unit is electrically connected to the at least one sensor and the suction motor via the wires;

the first vacuum pressure switch closes when the pressure drop across the vacuum cleaner bag exceeds a first threshold value corresponding to a maximum suction mode level, and the second vacuum pressure switch closes when the pressure drop across the vacuum cleaner bag exceeds a second threshold value corresponding to a maximum fill mode level, the first threshold value being smaller than the second threshold value;

the control unit has a maximum suction mode and a maximum fill mode;

the vacuum cleaner further comprises a selection switch for allowing a user to select between the maximum suction mode and the maximum fill mode;

when the maximum suction mode has been selected the control unit shuts off power to the suction motor when the first vacuum pressure switch closes; and when the maximum fill mode has been selected the control unit shuts off power to the suction motor when the second vacuum pressure switch closes.

5. The vacuum cleaner of claim 1, wherein the at least one sensor is a plurality of discrete sensors for monitoring a plurality of the operating characteristics, the vacuum cleaner further comprising encoding circuitry for encoding sensor signals from the plurality of sensors.

6. The vacuum cleaner of claim 5, wherein the control unit comprises a decoder circuit for decoding the sensor signals that are encoded by the encoding circuitry.

7. A vacuum cleaner comprising:

a canister having a portion that defines an intake port;

a suction motor within the canister for drawing air into the canister through the intake port;

a hose connected to the intake port for directing the air to the intake port;

a handle separate from the canister and connected to the hose;

at least one sensor within the canister responsive to an operating characteristic related to the operation of the vacuum cleaner for generating a corresponding sensor signal; and a control unit disposed within the handle for receiving the sensor signal from the at least one sensor in the canister and for controlling the operation of the vacuum cleaner in response to the sensor signal; wherein:

the hose contains wires that support two-way communications; and the control unit is electrically connected to the at least one sensor and the suction motor via the wires, wherein:

the wires comprise first and second code wires, a neutral wire, and a line wire; and the control unit controls the suction motor power by transmitting control signals via the first code wire and the neutral wire.

8. A vacuum cleaner comprising:

a canister having a portion that defines an intake port;

a suction motor within the canister for drawing air into the canister through the intake port;

a hose connected to the intake port for directing the air to the intake port;

a handle separate from the canister and connected to the hose;

at least one sensor within the canister responsive to an operating characteristic related to the operation of the vacuum cleaner for generating a corresponding sensor signal; and a control unit disposed within the handle for receiving the sensor signal from the at least one sensor in the canister and for controlling the operation of the vacuum cleaner in response to the sensor signal; wherein:

the hose contains wires that support two-way communications, said wires comprise first and second code wires, a neutral wire, and a line wire; and the control unit is electrically connected to the at least one sensor and the suction motor via the wires, wherein the control unit receives the sensor signal via the neutral wire and the second code wire.

9. A vacuum cleaner comprising:

a canister having a portion that defines an intake port;

a suction motor within the canister for drawing air into the canister through the intake port;

a hose connected to the intake port for directing the air to the intake port;

a handle separate from the canister and connected to the hose;

at least one sensor within the canister responsive to an operating characteristic related to the operation of the vacuum cleaner for generating a corresponding sensor signal; and a control unit disposed within the handle for receiving the sensor signal from the at least one sensor in the canister and for controlling the operation of the vacuum cleaner in response to the sensor signal; wherein:

the hose contains wires that support two-way communications; and the control unit is electrically connected to the at least one sensor and the suction motor via the wires, wherein the at least one sensor comprises a door switch that indicates whether a door is open.

10. The vacuum cleaner of claim 1, wherein the at least one sensor comprises a switch that indicates whether a bag is missing.

11. A vacuum cleaner comprising:

a housing having a portion that defines an intake port;

a vacuum cleaner bag within the housing connected to the intake port;

a suction motor contained within the housing for drawing air into the housing through the intake port and through the vacuum cleaner bag;

first and second vacuum pressure switches responsive to the pressure drop across the vacuum cleaner bag;

a control unit for controlling the operation of the vacuum cleaner, wherein the control unit has two bag change modes, the bag change modes being a maximum suction mode and a maximum fill mode; and a selection switch for allowing a user to select between the maximum suction mode and the maximum fill mode, wherein the control unit shuts off power to the suction motor when the first vacuum pressure switch responds to the pressure drop across the vacuum cleaner bag and the maximum suction mode has been selected, and wherein the control unit shuts off power to the suction motor when the second vacuum pressure switch responds to the pressure drop across the vacuum cleaner bag and the maximum fill mode has been selected.

12. The vacuum cleaner of claim 11, wherein the first vacuum pressure switch closes when the pressure drop across the vacuum cleaner bag exceeds a first threshold value corresponding to a maximum suction mode level and the second vacuum pressure switch closes when the pressure drop across the vacuum cleaner bag exceeds a second threshold value corresponding to a maximum fill mode level, the first threshold value being smaller than the second threshold value.

13. The vacuum cleaner of claim 11 further comprising first and second indicator lights for indicating which bag change mode has been selected.

14. The vacuum cleaner of claim 11 further comprising a maximum fill indicator light, wherein when the maximum fill mode has been selected and the control unit shuts off the power to the suction motor, the control unit repeatedly turns on and off the maximum fill indicator light.

15. The vacuum cleaner of claim 11 further comprising a maximum suction indicator light, wherein when the maximum suction mode has been selected and the control unit shuts off the power to the suction motor, the control unit repeatedly turns on and off the maximum suction indicator light.

* * * * *